United States Patent [19]
Mertesdorf et al.

[11] Patent Number: 5,838,000
[45] Date of Patent: Nov. 17, 1998

[54] METHOD DEVICE AND SYSTEM FOR OPTICAL NEAR-FIELD SCANNING MICROSCOPY OF TEST SPECIMENS IN LIQUIDS

[75] Inventors: Michael Mertesdorf; Stefan Kirstein, both of Berlin, Germany; Monika Schoenhoff, Lund, Sweden; Frauke Lohr, Recklinghausen, Germany

[73] Assignee: Huels Aktiengesellschaft, Marl, Germany

[21] Appl. No.: 854,168

[22] Filed: May 9, 1997

[30] Foreign Application Priority Data

Aug. 3, 1996 [DE] Germany .................. 196 31 498.4

[51] Int. Cl.[6] ........................................ H01J 3/14
[52] U.S. Cl. .................. 250/234; 250/216; 250/559.29; 250/306
[58] Field of Search ................... 250/234, 235, 250/216, 306, 307, 309, 310, 559.29; 356/375, 239, 240, 244, 246

[56] References Cited

U.S. PATENT DOCUMENTS 5,693,938 12/1997 Marchman et al. ............... 250/234

FOREIGN PATENT DOCUMENTS 0 545 538  6/1993  European Pat. Off. .
0 701 102  3/1996  European Pat. Off. .

OTHER PUBLICATIONS

Patrick J. Moyer, et al., Applied Physics Letter, vol. 68, No. 24, pp. 3380–3382, Jun. 10, 1996, "High–Resolution Imaging using Near–Field Scanning Optical Microscopy and Shear Force Feedback in Water".

Kenneth D. Weston, et al., Review of Scientific Instruments, vol. 67, No. 8, pp. 2924–2929, Aug. 1996, "Near–Field Scanning Optical Microscopy in Reflection: A Study of Far–Field Collection Geometry Effects".

George J. Collins, Laser Focus World, vol. 31, No. 11, pp. 104–107, Nov. 1, 1995, "Near–Field Microscopy Moves into the Mainstream".

Primary Examiner—Que Le
Attorney, Agent, or Firm—Oblon, Spivak, McClelland, Maier & Neustadt, P.C.

[57] ABSTRACT

A method, device, and system for optical near-field scanning microscopy on a test specimen in a liquid uses a light source that guides light focused on an optical fiber tip disposed near the test specimen. With the aid of the light beam extending largely parallel to the specimen surface, a diffraction pattern is formed downstream of the light source and the optical fiber tip. The diffraction pattern is detected and a resulting detection signal, which is indicative of a vibrational amplitude of the optical fiber tip, is used for controlling the distance between the optical fiber tip and the specimen, where the distance is related to the vibrational amplitude. Accordingly, optical near-field scanning microscopy may be performed in virtually any liquid, on non-smooth specimen surfaces, and on specimen surfaces whose features change with time.

19 Claims, 8 Drawing Sheets

Topography

Fluorescence

METHOD DEVICE AND SYSTEM FOR OPTICAL NEAR-FIELD SCANNING MICROSCOPY OF TEST SPECIMENS IN LIQUIDS

BACKGROUND OF THE INVENTION

1. Field of the Invention

The present invention relates to a method, device and system for detecting vibrating movements in optical near-field scanning microscopy instruments, as a result of which specimens such as, for example, surfaces of solids, thin organic layers or biological species, can be investigated in virtually any liquid.

2. Description of Related Art

Near-field scanning microscopy is based on the principle of bringing a very small light opening up to a specimen to be investigated as a probe in the near field, where a distance of the light opening to the specimen is a few nanometers. This small light opening is implemented by an optical fiber which is made from glass and drawn to an ultra-thin tip. The fiber, as a rule, is coated with an opaque metal, as described in U.S. Pat. No. 5,485,536, the contents of which are incorporated herein by reference. The tip is used as a very small light source by coupling light into the fiber at its other end. Alternatively, the tip can be used as a detector (receptor), by coupling light into the fiber from the specimen through the small opening and detecting the coupled light at the other end of the fiber. By scanning the tip over the specimen surface, it is therefore possible to generate an image of the specimen by transmission when light from the tip passes through the specimen and by reflection when light reflected from the specimen is received by the tip. The result of the scanning process is that the diffraction limit of a conventional light microscope is circumvented and the resolution is substantially improved, relative to conventional light microscopes.

The method described above permits optical transmission, reflection or fluorescence microscopy and simultaneous topography measurement with a resolution of 50 nm and less. Using this method it is possible to image, for example, proteins and other cellular structures at high resolution, where fluorescent light emitted by the specimen represents the imaging information, as described in U.S. Pat. No. 5,479,024 the contents of which are incorporated herein by reference.

Defined local illumination of the specimen requires the distance between the tip and the specimen to be kept constant during the scanning. For this purpose, the tip of the optical fiber is usually set to vibrate near the optical fiber's resonant frequency and parallel to the surface, use being made of the fact that, because of interactions when the tip approaches the specimen, the vibrational amplitude of the optical fiber is damped as a function of the distance between the tip and specimen, on the one hand, and a phase shift is caused, on the other hand. It is possible by continuously interrogating the vibration signal used to control the vibration of the fiber to set a constant strength of the interactions via a feedback coupling, and thus to ensure a constant distance of the tip from the specimen, as described by E. Betzig et al. in Appl. Phys. Lett. 60 (20), 1992, pages 2484 to 2486, the contents of which are incorporated herein by reference. Furthermore, WO 95/15480, the contents of which are incorporated herein by reference, describes a method suitable for this purpose for detecting the vibrating movement of an arbitrary measuring probe in air.

Investigations of test specimens in liquids for the purpose, for example, of observing processes proceeding on the specimen surface are of particular scientific and commercial interest, as identified by the present inventors. EP 0-701, 102-A1 describes a near-field scanning microscopy approach used in liquids, and thus, prevents denaturing of biological specimens. The design includes a tip which is bent and behaves in a fashion similar to a cantilever such as is used in scanning force microscopy. This tip is inserted laterally into a measuring cell which includes a specimen holder and a transparent cover plate, the two being held together by the surface tension of the liquid. The microscope is operated like a scanning force microscope. The procedure, described in EP 0-701,102-A1, for near-field scanning microscopy in liquids assumes that the liquid is held on the specimen only by its surface tension. This is the case, for example, in aqueous systems; in liquids whose surface tension is too low for this, for example surfactant solutions, this method cannot be applied (as recognized by the present inventors).

A further possibility for operating near-field scanning microscopy in liquids is described by Moyer et al. in Appl. Phys. Lett. 68 (24) 1996, pages 3380–3382, the contents of which are incorporated herein by reference. The specimen to be investigated is placed in this case on the bottom of a specially constructed glass vessel. Both the tip and the specimen are completely immersed in the liquid for the purpose of measurement. In this way, variation of the vibration signal of the tip is observed here, as well, as a function of distance of the tip to the specimen, the movement of the tip being detected as described below. A laser beam is radiated onto the specimen through the liquid at an oblique angle of incidence, and reflected therefrom. The tip is located in the reflected beam path, with the result that its vibrational amplitude can be measured at the detector. In this design, the opposite walls of the angular glass vessel must be arranged at a specific angle which admits the beam path described.

Above all, however, it has been found that this type of detection assumes the presence of a satisfactorily smooth, reflecting surface of the specimen because signal detection is not possible given excessively strong scattering of the reflected beam. For this reason, rough specimens and ones whose topography varies during measurement owing to the effect of the liquid are not accessible by the method of Moyer et al.

SUMMARY OF THE INVENTION

Accordingly, one object of this invention is to provide a novel optical near-field scanning microscopy device and method that overcomes the above-mentioned limitations of existing methods and systems.

Another object of the present invention is to render optical near-field scanning microscopy possible with specimens of any desired surface quality in liquids that are transparent to at a wavelength of a light source used in the scanning microscopy.

These and other objects are achieved by a device and method for optical near-field scanning microscopy of test specimens in liquids employing a laterally vibrating optical fiber tip. The optical fiber tip dips into the liquid and is kept at a controlled distance from the specimen surface to be investigated. The control of the distance is accomplished by detecting the vibrating movement of the optical fiber tip with a light beam (which may originate from a different source than that from the light beam admitted or accepted by the fiber tip) from a light source that is laterally guided (without reflection of the light beam off the specimen surface) through a vessel containing the exposed specimen and the liquid. The laterally guided light beam is focused onto the tip of the optical fiber, and the vibrating movement of the tip is detected by a light detector based on a diffraction pattern observed downstream of the light source and the optical fiber tip, and resulting from light of the light beam diffracted by the vibrating optical fiber tip. The exposed liquid and the vessel are transparent to light of the wavelength, $\lambda$, of the light source.

More particularly, a device according to the present invention for optical near-field scanning microscopy makes it possible to test specimens in liquids in a vessel by employing a laterally vibrating optical fiber tip. The vibrating optical fiber tip dips into the liquid and a distance between the tip and specimen surface is controlled by detecting the vibrating movement of the tip. The movement is detected by observing features of a diffraction pattern resulting from light of the light beam diffracted by the optical fiber tip, where the features of the diffraction pattern change as a function of the vibration amplitude of the optical fiber tip.

The specimen to be investigated is illuminated locally with light in this case (emitted from the optical fiber tip, or received by the optical fiber tip), where reflection, transmission, fluorescence and/or absorption characteristics of the specimen are analyzed, and an image is generated by scanning the tip over the surface of the specimen. When the method according to the present invention is used in near-field scanning microscopy, apart from the topography of a specimen adjoining a liquid, it is also possible to follow in-situ processes proceeding on the specimen's surface. In other words, by in-situ monitoring, changes in the topography, reflection, transmission, fluorescence and/or absorption of the specimen may be observed over time and during specific process steps.

By decoupling of the light beam, which detects the vibrating movement, from the specimen surface to be investigated, and by the construction of the measuring cell according to the present invention, unexpectedly improved results have been observed by applying near-field scanning microscopy to non-smooth, nonreflecting specimen surfaces in liquids, thereby opening up many new commercial and scientific applications.

The light beam used to detect the vibrating tip movement is in this case guided from a source, possibly after deflection (but not reflection at the specimen) and preferably at right angles to a stationary optical fiber axis of the optical fiber used to probe the specimen. The light beam travels in a path largely parallel to the specimen surface through the specimen vessel and the liquid and is focused onto the tip of the optical fiber. A diffraction pattern is generated by the movement of the optical fiber tip in the liquid and the diffraction pattern is detected (preferably) after the light beam passes through the liquid and exits the vessel. A detector, preferably located outside the vessel, detects the diffraction pattern and features thereof, in a conventional way, and as a result of the detection, the movement of the tip can be followed. The present inventor identified that a liquid, which is transparent at the wavelength, $\lambda$, of the light beam permits the possibility of detecting the vibrating movement of the tip independent of other physical properties.

The detected signal is preferably used to determine not the phase shift, but the vibrational amplitude of the optical fiber tip. The detected vibrational amplitude is preferably used as a control variable for controlling the distance between the tip and specimen surface. As previously described, the amplitude of the constantly excited vibration of the optical fiber tip is damped in the liquid because of interactions as a function of the distance between the tip and specimen. By constantly controlling the distance between the specimen and tip it is thus possible, with the aid of the detected vibrational amplitude signal when scanning, to scan the specimen surface with many beneficial results as compared to conventional systems and methods.

The distance between the tip and specimen is preferably maintained between 5 to 10 nm and the tip of the optical fiber is set to a diameter of between 10 to 100 nm. The magnitude of the vibrational amplitude of the tip is generally up to 5 nm. The vibration is generated with the desired amplitude with the aid, preferably, of a piezoelectric quartz crystal to which the tip of the optical fiber is fastened. In one embodiment, the optical fiber guides a light of a light source, preferably a laser, onto the specimen surface (alternatively, light from the specimen to the optical fiber tip) with the result being that the specimen can be investigated by near-field scanning microscopy using transmission (or reflection) geometry. Developing the image of the specimen based on the detected light can be performed in a way known to a person of ordinary skill in the optical near-field scanning microscopy art, for example by a polarization method, a refractive index method or a fluorescence contrast method.

As discussed above, in order to detect the vibrating movement of the optical fiber tip according to the invention, it is preferable for both the exposed liquid and the vessel to be transparent to light of the wavelength, $\lambda$, of the light source of the light beam used to produce the diffraction pattern.

The vessel, which can be produced from glass, transparent polymers or other transparent materials, is preferably constructed such that the light beam for detecting the vibration impinges on the vessel walls ideally at right angles, although other angles can be accommodated with the assistance of auxiliary optic devices (lenses, mirrors, etc.). In the preferred embodiment, in which the light beam is guided at right angles to the axis of the stationary optical fiber (i.e., which has the tip formed at an end thereof), conventional vessels made from, for example, glass can thus be used. No specially shaped measuring cells are required. The vessels should be designed such that two opposite vessel walls are transparent and at right angles to the detecting light beam.

Lasers are preferably used as light sources for the detecting light beam, while photodiodes are suitable as light detectors. The alignment of the light beam in the preferred embodiment is generally parallel to the specimen surface of the specimen and can be realized by suitable optical deflecting devices such as, for example, prisms, mirrors and the like which are arranged in the beam path upstream and/or downstream of the optical fiber, preferably outside the liquid vessel.

The vessel containing the specimen and the exposed liquid is arranged such that it can be displaced at right angles to the optical fiber axis, in order to render it possible to scan a region of the specimen surface. However, it is also possible to displace the actual microscope arrangement with the optical fiber tip such that the tip is moved in a scanning motion over the specimen which is held stationary.

In light of the above discussion of the present invention, the present invention therefore offers the following advantages. By contrast with the conventional examples, in the case of near-field scanning microscopy, it is possible according to the present invention to detect a change, which is a function of distance, in the vibration signal of the tip when the tip is disposed over the specimen in liquids even if the specimen surface is not smooth and not reflecting. For this purpose, at least a portion of the tip and the specimen are completely immersed in the liquid. A structure of the liquid vessel need not be complex to serve its purpose of transmitting the detected light beam and holding the liquid and specimen. Accordingly, the integration of the vessel and detection device in the set-up of the present inventive microscope makes it possible to detect the vibrational amplitude and the phase shift and thus to control the distance between the tip and any desired specimen in virtually any desired liquid. Optical near-field investigations of any desired test specimens in numerous liquids can thus be carried out.

The advantage achieved thereby resides in the possibility of observing in the optical near-field any desired specimens in all liquids which are satisfactorily transparent to the wavelength, λ, of the light which is used to detect the vibration of the optical fiber and do not attack the device components. By comparison with the prior art, the advantage is to be seen, in particular, in that in accordance with the present invention there is no limitation with regard to selecting the specimen.

Furthermore, the present invention renders it possible, by measuring in a liquid, to investigate the influence of various liquid characteristics such as, for example, temperature, pH value, composition of the liquid, flow conditions etc. on the specimen with the high resolution which can be achieved in near-field scanning microscopy. It is possible in this way also to follow directly, for example, corrosion processes or the behavior of surfaces capable of swelling, such as hydrogels.

In combination with the above mentioned fluorescence detection in microscopy, it being possible to involve autofluorescence or a fluorescence marker bound in advance, processes proceeding at the liquid/solid interface can be imaged in-situ even if the specimen topography changes during the test. The method according to the present invention can be used, for example, to observe the adsorption of protein layers even on specimens which scatter light because of their rough surface. Owing to the imaging made available by the present invention, it is possible for the first time to observe, as a function of time, surface coatings in the aqueous medium, and it is possible to follow protein accumulations and enzymic reactions on non-ideal surfaces, and consequently, this opens up new avenues for sensor technology and medical technology.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
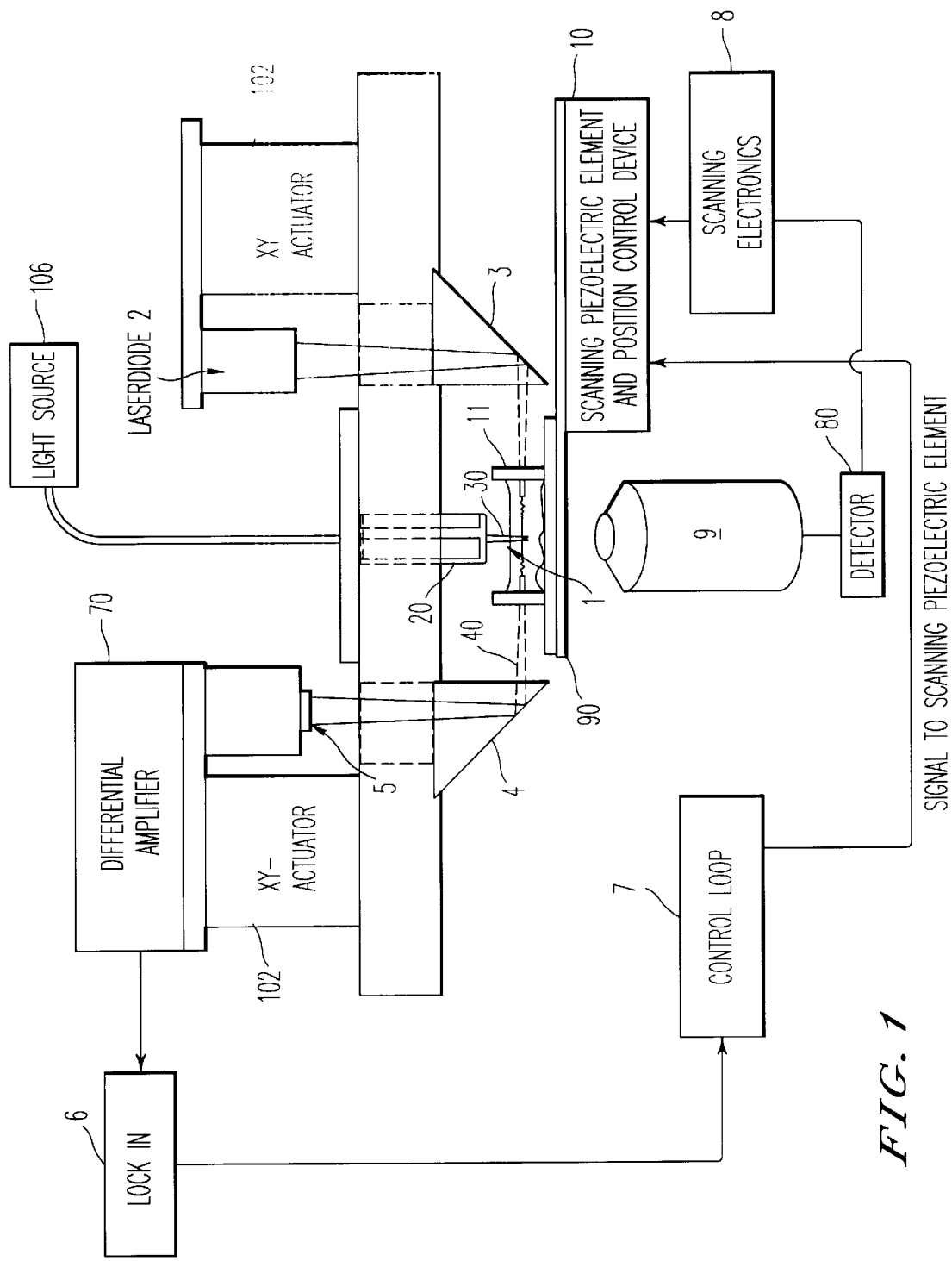
FIG. 1 is a schematic diagram of the near-field scanning microscope according to the present invention.

Referring now to the drawings, wherein like reference numerals designate identical or corresponding parts throughout the several views, and more particularly to FIG. 1 thereof, there is illustrated a near-field scanning microscope according to the present invention.

FIG. 1 shows the set-up of the near-field scanning microscope with a liquid vessel 11, and the component parts which are used to measure the vibration of a fiber optic tip 30 of the optical fiber 1 and to set the distance between the tip 30 and a specimen in the liquid vessel 11. The vessel 11 is made of glass, although transparent polymers or other transparent materials are alternatives, where walls of the vessel 11 are arranged at right angles to a light beam produced by a laserdiode 2. The ultra-thin tip 30 (with diameter of between 10 to 100 nm) of the optical fiber 1 is bonded to a piezoelectric tube 20 which is used to set the tip 30 vibrating, thereby moving the tip 30 laterally over a surface of a specimen in the liquid vessel 11. A vibration control signal is provided within the piezoelectric tube 20 which controls the vibration of the piezoelectric tube 20. In the preferred embodiment, the optical fiber tip 30 emits a light from a laser light source 106 (alternatively derived from laserdiode 2) that illuminates the specimen.

A movable laser diode 2 is moved in an X-Y plane by an x-y actuator 102 and provides a light beam which is not used to illuminate the specimen, but rather for measuring the vibrational amplitude of the fiber optic tip 30. A light beam from the laser diode 2 is guided by a prism 3 (or other suitable optic device such as aL mirror) and focused on the fiber optic tip 30 and diffracted light propagates therefrom so as to produce a diffraction pattern 40. The diffraction pattern 40 produced downstream of the optical fiber tip 30 is imaged by another prism 4 (or other suitable optic device) onto a double photodiode 5 (or other light sensing device such as a charge coupled device, CCD, array), which converts the light energy into electrical signals. Respective electrical signals from the two photodiodes 5 are provided to a differential amplifier 70 in the form of differential signals containing a direct current (DC) component and an alternating (AC) component. The prism 4, photodiodes 5 and differential amplifier 70 are movable in the X-Y plane by the X-Y actuator 102 so as to be positioned to receive the diffraction pattern 40 when the laser diode 2 is moved by the X-Y actuator 102.

The AC component of the differential signals is detected by a lock-in amplifier 6 and is a measure of the vibrational amplitude of the optical fiber tip 30, and therefore a measure of the distance between the optical fiber tip 30 and the specimen in the vessel 11 is made. The detected signal from the lock-in amplifier 6 is used as a control variable for a control loop 7 which controls the distance via a piezoelectric element and position control device 10 in such a way that the vibrational amplitude remains constant. A scanning piezoelectric element and position control device 10 receives the detected signal from the control loop 7 and adjusts the distance between the optical fiber tip 30 and the specimen by moving the plate 90 toward or away the optical fiber tip 30 based on whether the control loop signal indicates the vibrational amplitude is greater than or less than a predetermined threshold. A processor in the scanning piezoelectric element and position control device 10 holds the threshold and compares the threshold with the control loop signals. Alternatively, the control loop 7 may provide the detected signal to the x-y actuator so as to raise/lower the tip 30, laser diode 2, and prisms 3 and 4 so as to adjust the relative distance between the tip 30 and the specimen in the vessel 11.

The scanning electronics (8) controls a scanning operation for scanning the tip 30 over the specimen surface and a data acquisition operation. Scanning signals produced by the scanning electronics 8 are provided to the scanning piezoelectric element and position control device 10, which responds by moving the table 90 using piezo actuators. Alternatively, but only preferred when using the reflection mode scanning piezoelectric element and position control device 10 provides a scanning signal (originating from the scanning electronics 8) to the X-Y actuator 102, which moves the tip 30, laserdiode 2, prisms 3 and 4, photodetectors 5 and differential amplifier 70 in a scanning motion over the specimen in the vessel 11. The scanning electronics 8 employs a processor to assist in preparing the scanning signal, although other devices such as an application specific integrated circuit (ASIC), for example, may be used instead.

A microscope objective 9 is used to collect light emanating from the optical fiber tip 30 through the specimen and project the light onto the detector 80 (a photodiode, a photomultiplier, or alternatively a CCD array or the like). Alternatively, the scanning electronics 8 includes the detector 80. The microscope objective 9 is intended to indicate that in the present embodiment, the entire set-up is integrated into an inverse microscope.

Data collected by the detector 80 is provided to the scanning electronics 8 where it is then organized and stored in memory under the control of the processor in the scanning electronics 8. The stored data may then be forwarded to a printer or other data recording device (including digital memory, a digital camera, a computer, etc.).

The liquid cell 11 into which the tip dips is shown as being supported by the supporting holder 90. The walls of the liquid cell 11 are planar, as a result of which the projection of the light from the laserdiode 2 onto the optical fiber tip 30 is not disturbed. Alternatively, corrective optics can be employed to correct for disturbances in the light beam caused by the walls of the liquid cell 11.

The present invention is explained in more detail through the following examples, without being limited thereto.

EXAMPLE 1

Polystyrene (PS) (Vestyron® 116 available from HÜLS AG) is dissolved in tetrahydrofuran (THF) (10% by weight). The solution is put into the quartz glass measuring cell 11, where it is then cleaned using 2-propanol in an ultrasonic bath and as a result of the cleaning, the bottom of the liquid cell 11 is covered with a layer approximately 2 mm thick. After complete vaporization of the solvent, a transparent thin PS film is left on the bottom of the measuring cell 11. The cell is installed in the microscope (e.g., the device shown in FIG. 1), and the surface of the PS film is firstly observed in air. For this purpose, the position of the measuring cell 11 is adjusted in such a way that the reflections at the cell walls are as small as possible, in order to be able to measure a sufficiently large control signal at the double photodiode 5. Then, the optical fiber tip 30 is brought up to the cell as controlled by the control device 10 and supporting plate 90 until, as already previously described, damping of the vibrational amplitude occurs. An entire image is now recorded by scanning the specimen relative to the optical tip 30, in such a way that the vibrational amplitude of the tip is kept constant.

Figure 2:
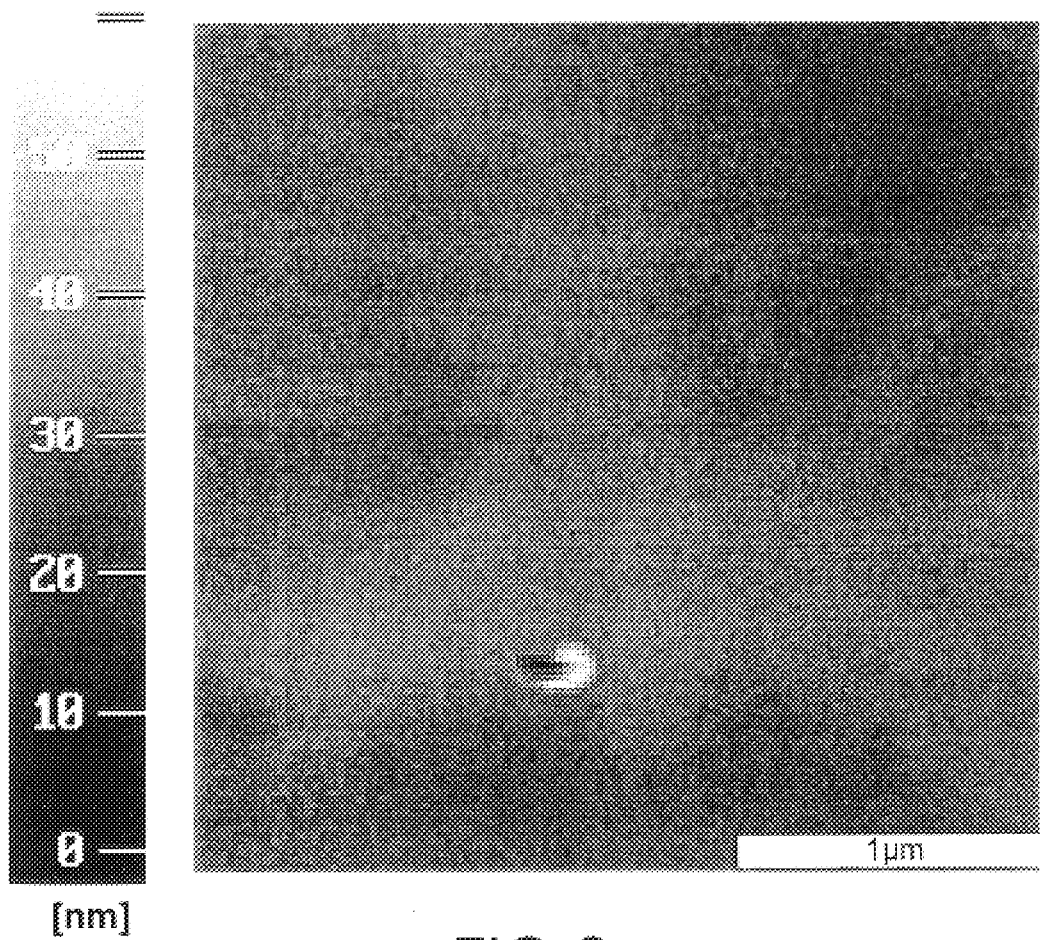
FIG. 2 is a topography image of a polystyrene film observed in air.

FIG. 2 shows a topography image of the above described polystyrene film in air. In FIG. 2, feature sizes are shown in reference to the "1 µm" legend, and depressions are expressed in a gray-scale form as shown in the "nm" scale on the left-hand side of FIG. 2. Clearly, a smooth surface of the film is present, as is evident from FIG. 2 which shows that the roughness is below 1 nm. A depression which measures a few hundred nanometers and is about 40 nm deep is to be seen in the lower part of FIG. 2.

Figure 3:
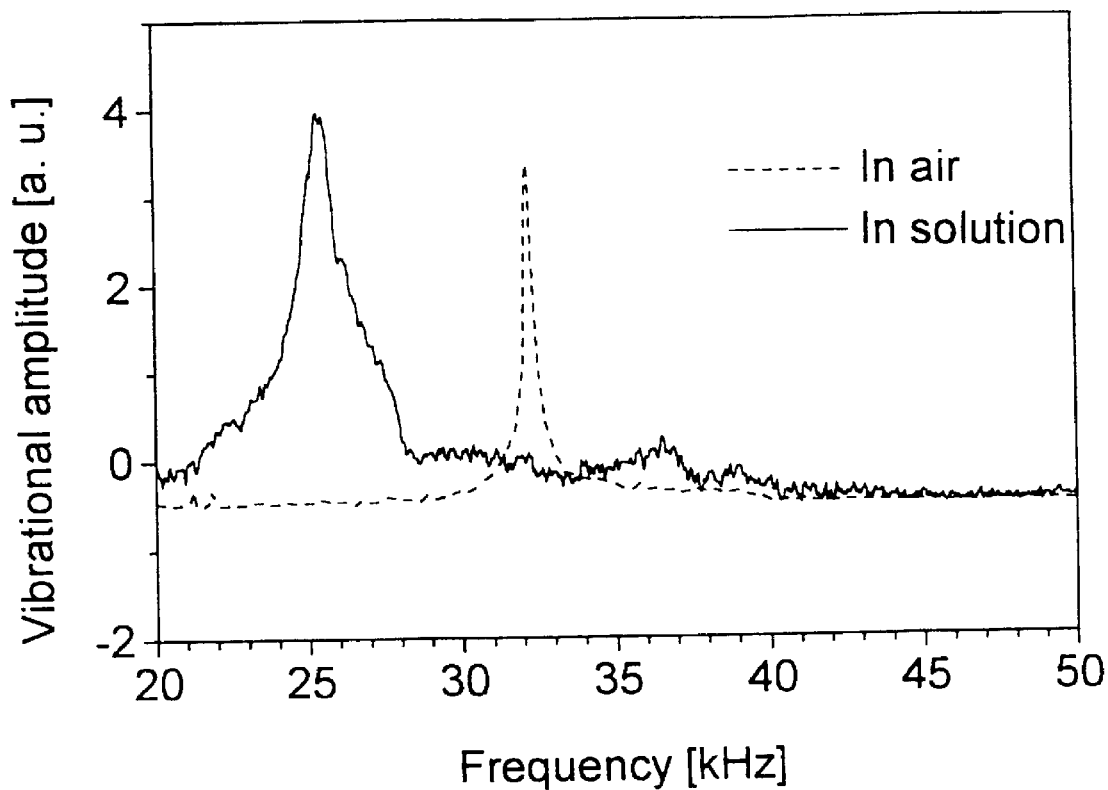
FIG. 3 is a graph of frequency versus vibrational amplitude having two curves therein where each curve is representative of when an optical fiber tip is disposed in solution and air respectively.

FIG. 3 will be used to describe the next process step. A few milliliters of water are added to the measuring cell 11, with the result that both the specimen, which includes the PS film, and the optical fiber tip 30 are completely immersed in the liquid. Firstly, the resonant frequency of the optical fiber tip 30 in water is determined. Due to the viscosity of the water, the resonant frequency of the optical fiber tip 30 is shifted toward lower frequencies. This effect is represented in FIG. 3. In this case, curve 1 shows the resonance characteristic of the fiber tip 30 in air (with a peak near 32 kHz), and curve 2 shows the same in water (with a peak near 25 kHz).

Figure 4:
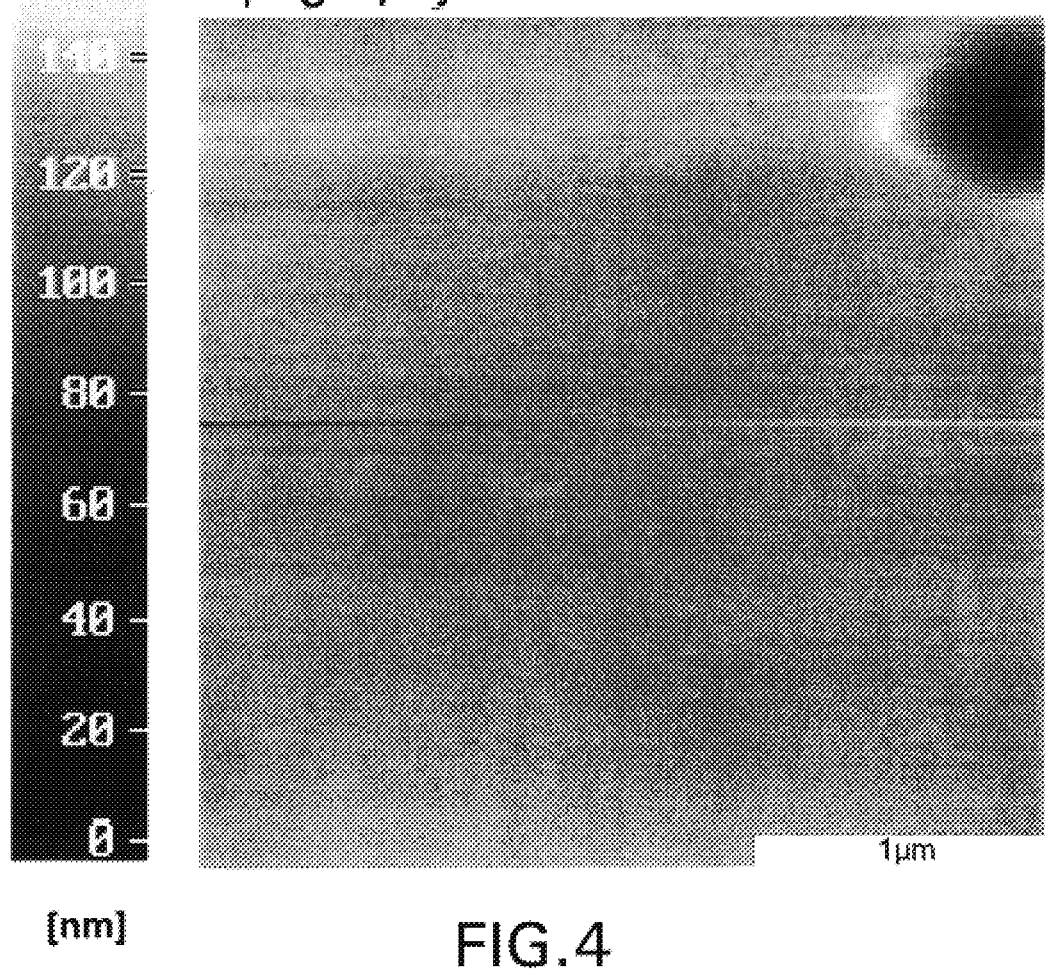
FIG. 4 is a topography image of a polystyrene film observed in water.

FIG. 4 is a topography image of the polystyrene film in water. A surface set-up similar to that in air is seen, where the film is smooth within the bounds of 1 nm and has depressions measuring a few hundred nanometers in size and a few 10 nm deep. It is to be seen from this example that by using the set-up according to the present invention it is possible, by detecting a friction force (e.g., interactions), in conjunction with a shift in the resonant frequency of the scanning tip to make a topography measurement in liquids just as in air.

EXAMPLE 2

In a second example, a bottom of a measuring cell 11 is covered with a transparent PS film as was described in Example 1. A few milliliters of a solution of fluorescein isothiocyanate-labeled human serum albumin (available from SIGMA, Delsenhofen) in a phosphate buffer (pH=7.4, PBS tablets from SIGMA) are added to the measuring cell 11. Care is to be taken here, in turn, that both the specimen and the tip 30 are completely immersed in the liquid.

Figure 5A:
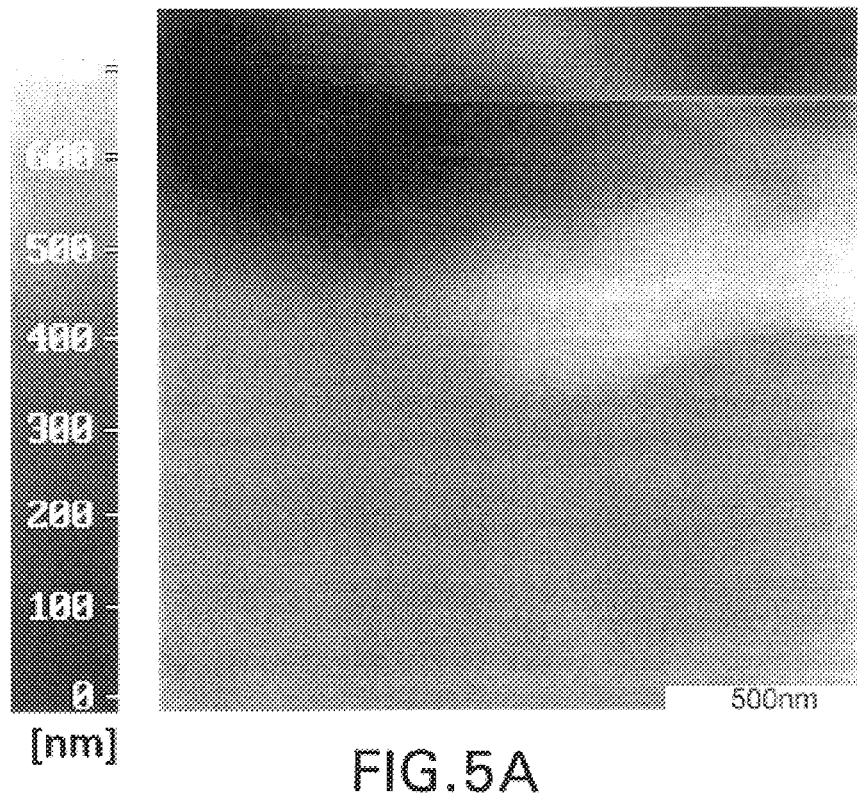
FIGS. 5A and 5B show the respective topography and simultaneously measured fluorescence images of fluorescence-labeled proteins adsorbed on a specimen.
Figure 5B:
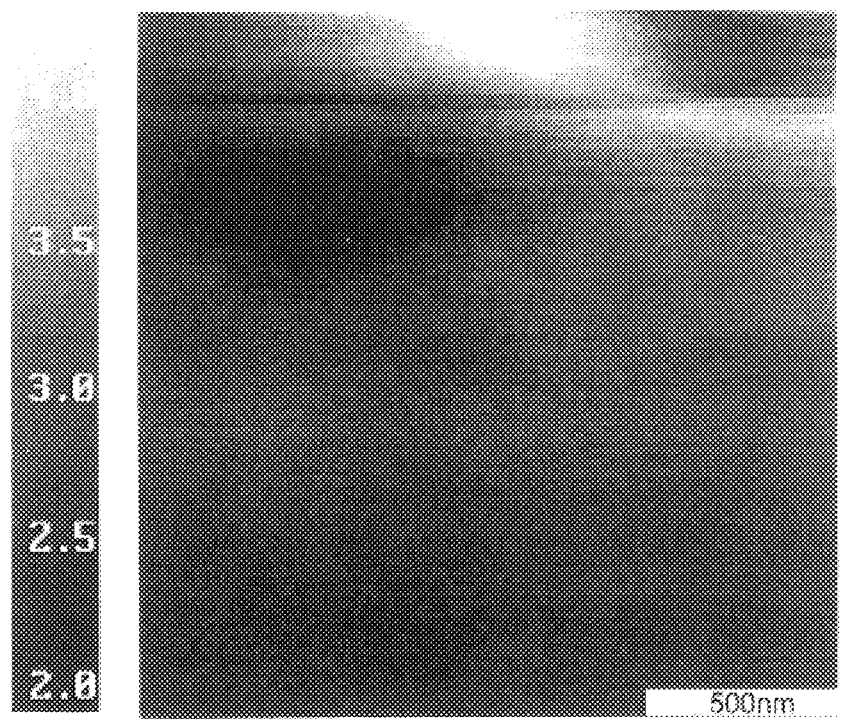

FIGS. 5A and 5B respectively show the topography and the simultaneously measured fluorescence of the fluorescence-labeled proteins adsorbed on the specimen. A clear correlation is evident between the topography of the surface and the spatially resolved fluorescence.

Figure 6A:
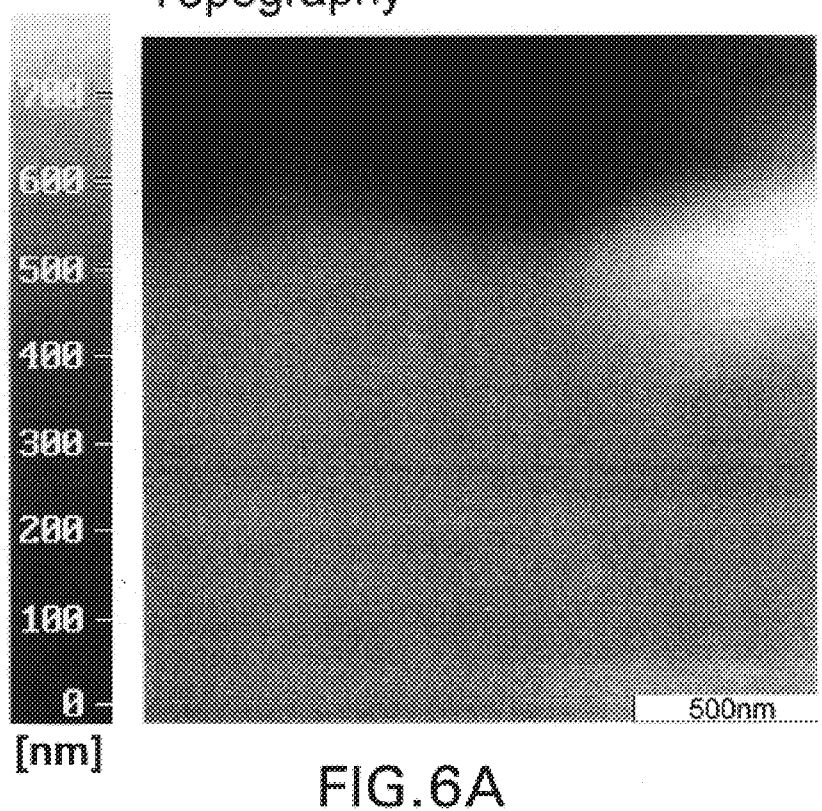
FIGS. 6A and 6B show the respective topography and fluorescence images of a same site at that observed in FIGS. 5A and 5B at a later instant in time.
Figure 6B:
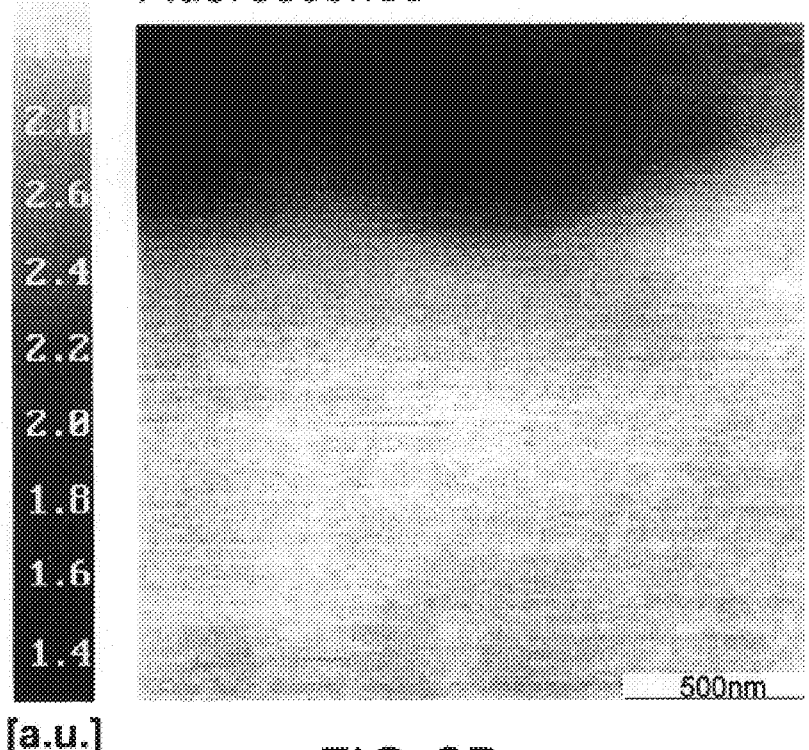

FIGS. 6A and 6B likewise respectively show the topography and the simultaneously measured fluorescence of the same site at a later instant. It is seen in the lower part of the figure that the contrast in the spatially resolved fluorescence is reduced. This reduction is caused by the advancing adsorption of the proteins on the surface, with the result that the latter is covered more homogeneously.

The example shows that spatially resolved microscopy in liquids is possible with a resolution in the region of about 50 nm using the set-up according to the present invention. The example also shows that temporally occurring changes to the specimen can be observed as a result of employing the present invention.

EXAMPLE 3

Figure 7A:
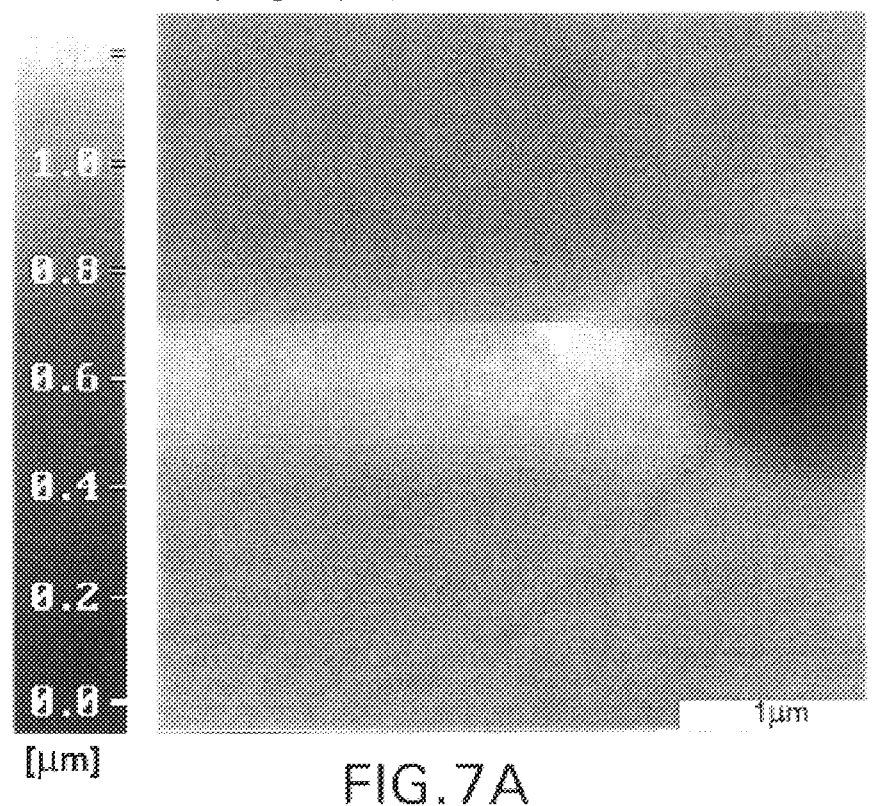
FIGS. 7A and 7B show the respective topography and simultaneously measured fluorescence images a near-field optical investigation of a surface in a buffer solution.
Figure 7B:
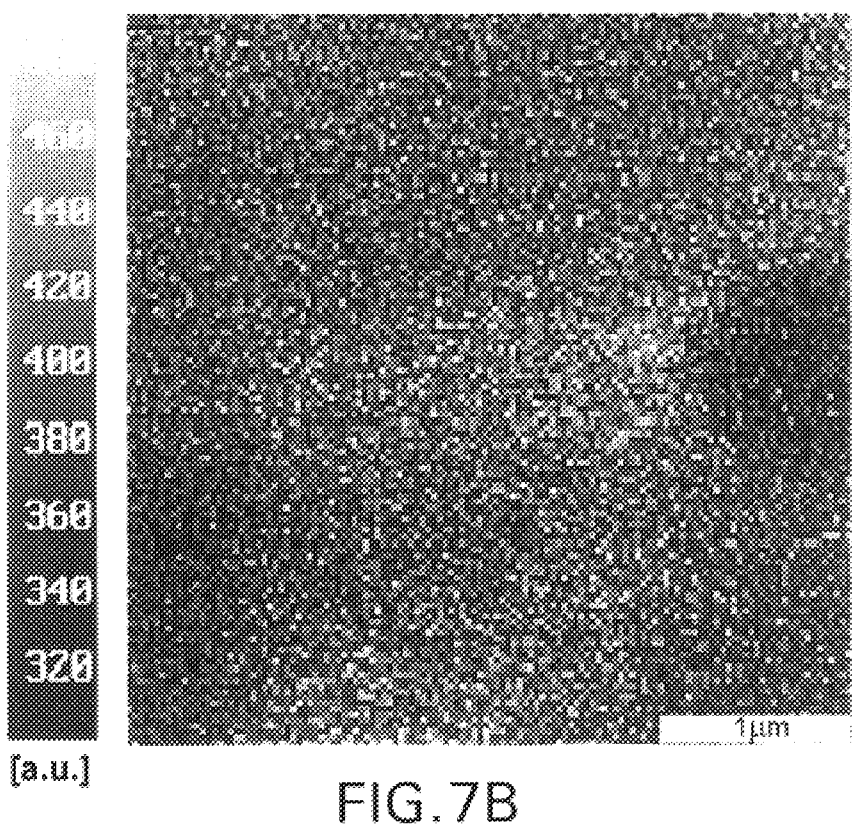

In this example, the system described in Example 2 is used, and the buffer solution containing the fluorescence-labeled proteins is replaced in the measuring cell 11 by a pure buffer solution. FIGS. 7A and 7B respectively show the near-field optical investigation of the surface in the buffer solution. The images have a substantially lower rate of fluorescence on the smooth surface by contrast with the measurement from Example 2, which points to the fact that some of the proteins were removed during rinsing. In this experiment as well, less fluorescence was measured in the depression than on the smooth surface. This example confirms that high-resolution microscopy can be performed in liquids using the set-up described in the invention.

Figure 8:
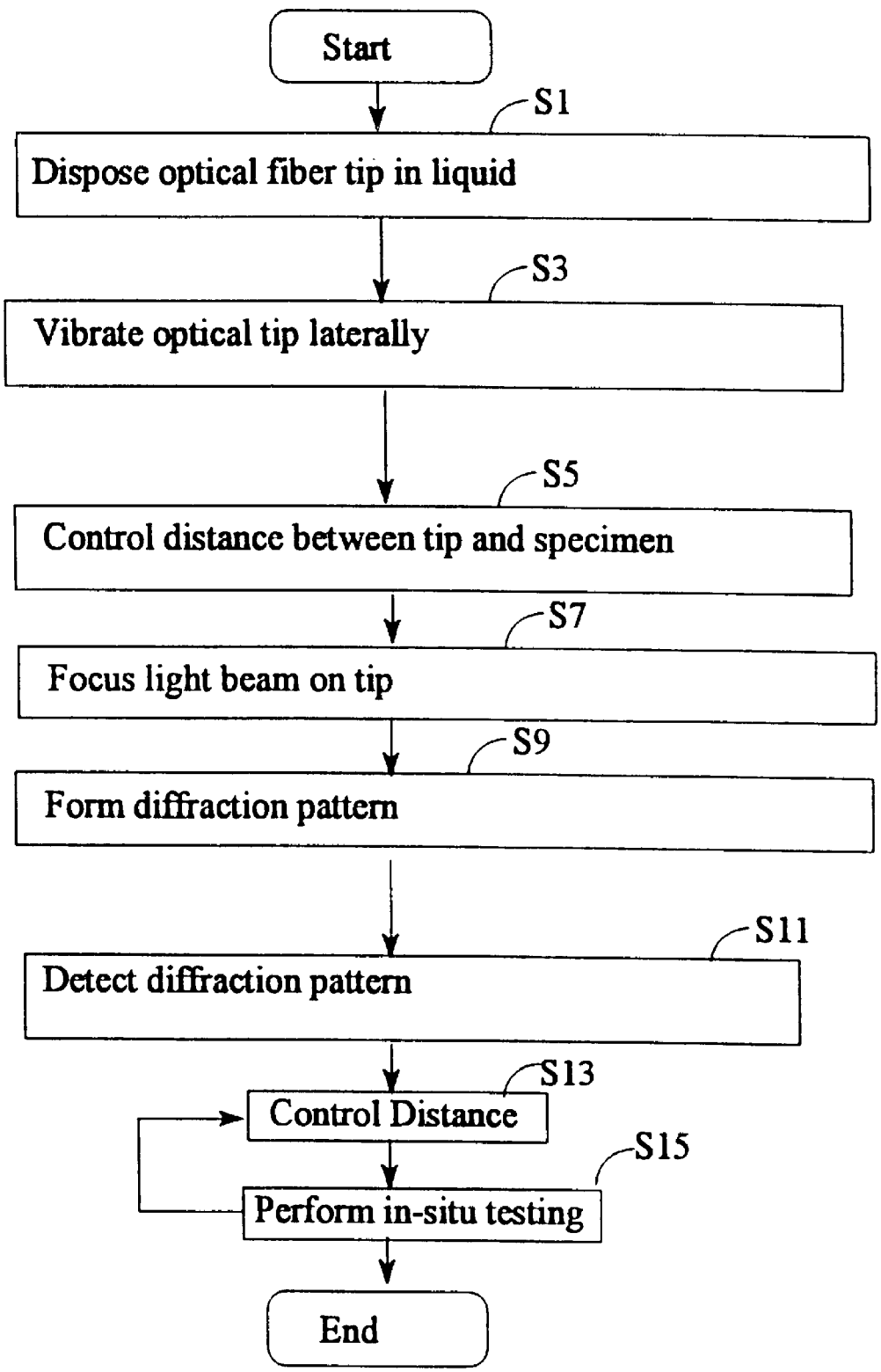
FIG. 8 is a flowchart of a near-field scanning microscope process according to the present invention.

FIG. 8 is a flowchart of a near-field scanning microscopy process according to the present invention. The process begins in step S1 where the optical fiber tip is disposed in the liquid. The process then proceeds to step S3 where the optical fiber tip is made to vibrate over a surface of a specimen that is under investigation. Once vibrating in step S3, the process proceeds to step S5 when a distance between the optical fiber tip and the specimen is controlled by observing a vibrational amplitude of the optical fiber tip. The vibration amplitude is observed by, in step S7, focusing a light beam through the liquid vessel and the liquid and onto the optical fiber tip. The process then proceeds to step S9 in which a diffraction pattern is formed downstream of the light source and the optical fiber tip. The process then proceeds to step S11 where the diffraction pattern is detected and a detection signal corresponding to the vibration amplitude is produced. Subsequently, in step S13 the detection signal is provided via a control loop to a controller which adjusts, if necessary, the distance between the optical fiber tip and the specimen so that the observed vibrational amplitude of the optical fiber tip is within a predetermined range. Subsequently, in-situ testing steps while making scanned images are performed in Step S15 where the distance is continually controlled by returning to step S13 while performing the in-situ testing. The process ends when all of the in-situ tests have been completed.

At least the scanning, control, detection, and data acquisition aspects of the present invention may be conveniently implemented using one or more conventional processors programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A method for performing optical near-field scanning microscopy on a test specimen in a liquid, comprising the steps of;
   disposing an optical fiber tip in the liquid proximate the test specimen;
   vibrating the optical fiber tip;
   controlling a distance between said optical fiber tip and said test specimen, said controlling step comprising,
      focusing a light beam from a light source through said vessel and said liquid on said optical fiber tip without reflection at a surface of the specimen, said liquid and said vessel being transparent at a wavelength of the light beam,
      forming a diffraction pattern from a portion of said light beam diffracted by said optical fiber tip, said diffraction pattern formed downstream of said light source and said optical fiber tip, and
      detecting the diffraction pattern with a light detector and producing a detection signal; and
   observing said specimen in said liquid with said optical fiber tip via optical near-field scanning microscopy.

2. The method as claimed in claim 1, wherein said controlling step comprises controlling a vibrational amplitude of the optical fiber tip as a controlled variable of the distance between the optical fiber tip and the specimen.

3. The method as claimed in claim 1, further comprising at least one of the steps of guiding a light of another light source onto the specimen surface and then to a detector, and guiding a light from the specimen to the detector.

4. The method as claimed in claim 1, wherein said vibrating step comprises vibrating the optical fiber tip with a piezoelectric crystal element.

5. The method as claimed in claim 1, wherein said performing step comprises investigating the specimen using at least one of light transmission and light reflection optical near-field microscopy.

6. The method as claimed in claim 1, further comprising the step of imaging the surface of the specimen using at least one of a polarization method, a refractive-index method and a fluorescence contrast method.

7. The method as claimed in claim 1, further comprising the step of detecting in-situ changes on a surface of the specimen.

8. The method as claimed in claim 1, further comprising the step of monitoring in-situ adsorption processes on a surface of the specimen.

9. A device for optical near-field scanning microscopy of a test specimen in a liquid, comprising;
   a liquid cell that holds said liquid and said test specimen therein;
   a fiber optic having an optical fiber tip that is disposed in said liquid within a predetermined distance range relative to said specimen;
   a vibration element mechanically coupled to said optical fiber tip that causes said optical fiber tip to vibrate;
   a light source that produces light having a wavelength, said light following a path through said liquid cell and said liquid and focused on said optical fiber tip which diffracts a portion of light so as to produce a diffraction pattern downstream of said light source and said optical fiber tip, the liquid and the liquid cell being transparent at the wavelength of the light;
   a light detector which detects the diffraction pattern and outputs a corresponding detection signal; and
   a controller configured to control the distance range between the optical fiber tip and specimen surface in response to receiving the detection signal.

10. The device as claimed in claim 9, further comprising at least one optical device configured to at least one of deflect, focus, and expand the light guided through the liquid.

11. The device as claimed in claim 9, wherein said light detector comprises either a single photodiode or a double photodiode.

12. The device as claimed in claim 9, wherein said light source comprises a laserdiode.

13. The device as claimed in claim 9, wherein said vibration element comprises a piezoelectric crystal element.

14. A system for performing in-situ optical near-field scanning microscopy of a test specimen in a liquid comprising:

a liquid cell which holds said liquid and said test specimen therein;

a fiber optic having an optical fiber tip disposed in said liquid within a predetermined distance range relative to said specimen;

a vibration element mechanically coupled to said optical fiber tip that causes said optical fiber tip to vibrate laterally;

a light source that produces light having a wavelength, said light following a path through said liquid and said liquid cell and focused on said optical fiber tip which diffracts a portion of light so as to produce a diffraction pattern downstream of said light source and said optical fiber tip, the liquid and the vessel being transparent at the wavelength of the light;

a light detector which detects the diffraction pattern and outputs a corresponding detection signal, said detection signal varying in response to changes in said surface of said specimen as a result of in-situ processes performed on said specimen; and a controller configured to maintain the distance between the optical fiber tip and specimen surface within the predetermined distance range in response to receiving the detection signal.

15. The system of claim 14, further comprising a control loop that provides said detection signal to said controller.

16. The system of claim 14, further comprising imaging means for developing an image of said specimen using light from said optical fiber tip.

17. The system of claim 14, further comprising scanning means for moving said optical fiber tip relative to said liquid vessel.

18. A system for performing in-situ optical near-field scanning microscopy of a test specimen in a liquid comprising:

a liquid cell which holds said liquid and said test specimen therein;

a fiber optic means having probe means disposed in said liquid within a predetermined distance range relative to said specimen;

vibration means mechanically coupled to said probe means that causes said probe means to vibrate laterally;

a light source that produces light having a wavelength, said light following a path through said liquid and said liquid cell and focused on said probe means which diffracts a portion of light so as to produce a diffraction pattern downstream of said light source and said probe means, the liquid and the vessel being transparent at the wavelength of the light;

detection means for detecting the diffraction pattern and outputting a corresponding detection signal, said detection signal varying in response to changes in said surface of said specimen as a result of in-situ processes performed on said specimen; and control means for maintaining the distance between the probe means and specimen surface within the predetermined distance range in response to receiving the detection signal.

19. The system of claim 18, further comprising means for observing changes in said specimen when said specimen is subjected to in-situ testing.

\* \* \* \* \*